US011684037B2

(12) United States Patent
Clarke et al.

(10) Patent No.: US 11,684,037 B2
(45) Date of Patent: Jun. 27, 2023

(54) AUTOMATED PET FOOD DISPENSER

(71) Applicant: Product Ventures, Ltd., Fairfield, CT (US)

(72) Inventors: Peter Brian Clarke, Newtown, CT (US); John K Clay, Milford, CT (US); Trond Erik Tollefsen, London (GB)

(73) Assignee: Product Ventures, Ltd., Fairfield, CT (US)

( * ) Notice: Subject to any disclaimer, the term of this patent is extended or adjusted under 35 U.S.C. 154(b) by 266 days.

(21) Appl. No.: 17/098,075

(22) Filed: Nov. 13, 2020

(65) Prior Publication Data

US 2021/0144962 A1 May 20, 2021

Related U.S. Application Data

(60) Provisional application No. 62/935,320, filed on Nov. 14, 2019.

(51) Int. Cl.
   *A01K 5/02* (2006.01)
   *B65D 83/00* (2006.01)
   *A01K 29/00* (2006.01)

(52) U.S. Cl.
   CPC .......... *A01K 5/0225* (2013.01); *A01K 29/005* (2013.01); *B65D 83/0072* (2013.01)

(58) Field of Classification Search
   CPC ...... A01K 5/0225; A01K 29/005; A01K 5/01; A01K 5/0114; A01K 5/027; A01K 5/0291; B65D 83/0072
   See application file for complete search history.

(56) References Cited

U.S. PATENT DOCUMENTS

| | | | | |
|---|---|---|---|---|
| 2,565,026 A | * | 8/1951 | Hutt | A24F 23/02 383/122 |
| 2,885,141 A | * | 5/1959 | Goodrich | A01K 39/012 383/207 |
| 2,943,600 A | * | 7/1960 | Rosoff | A01K 39/012 119/464 |
| 2,946,637 A | | 7/1960 | Becker | |
| 3,373,917 A | * | 3/1968 | Cox | B65D 5/60 206/811 |
| 4,079,699 A | | 3/1978 | Longmore et al. | |
| 4,494,806 A | | 1/1985 | Williams et al. | |

(Continued)

OTHER PUBLICATIONS

International Searching Authority; Notification of Transmittal of the International Search Report and the Written Opinion of the International Searching Authority, or the Declaration; dated Apr. 1, 2021; PCT Application No. PCT/US20/60571 filed Nov. 13, 2020; pp. 1-13.

(Continued)

*Primary Examiner* — Ebony E Evans
(74) *Attorney, Agent, or Firm* — Richard M Lehrer; FisherBroyles LLP

(57) ABSTRACT

A container is disclosed for maintaining, shipping and dispensing granular material such as but not limited to pet food. The container includes an aperture in the bottom which is sealed with a pull tab until the material is ready for dispensing. An automated dispenser of such granular materials is also disclosed such that an insert in a drawer located below an aperture in the dispenser controls the amount of material that is dispensed from the container that sits atop the dispenser.

21 Claims, 15 Drawing Sheets

(56) References Cited

U.S. PATENT DOCUMENTS

| | | | |
|---|---|---|---|
| 4,562,940 A * | 1/1986 | Asphar | B65D 83/06 222/88 |
| 4,576,316 A | 3/1986 | Foster | |
| RE32,456 E | 7/1987 | Ishii | |
| 5,090,975 A | 2/1992 | Requejo et al. | |
| 5,299,529 A | 4/1994 | Ramirez | |
| 5,404,838 A | 4/1995 | Khan | |
| 5,483,923 A | 1/1996 | Sabbara | |
| 5,617,974 A * | 4/1997 | Sawyer, Jr. | B65D 83/06 222/561 |
| 5,857,586 A * | 1/1999 | Scherr | B65D 33/14 221/45 |
| 5,945,145 A | 8/1999 | Narsutis et al. | |
| 6,055,932 A | 5/2000 | Weber | |
| 6,109,315 A * | 8/2000 | Stern | B67D 3/0032 141/330 |
| 6,126,318 A | 10/2000 | Bell | |
| 6,953,069 B2 * | 10/2005 | Galomb | A01C 15/003 141/330 |
| 7,228,816 B2 | 6/2007 | Turner et al. | |
| 7,426,901 B2 | 9/2008 | Turner et al. | |
| 8,277,121 B2 | 10/2012 | Bell et al. | |
| 8,640,648 B2 * | 2/2014 | Lathim | A01K 1/0107 119/165 |
| 9,307,691 B2 | 4/2016 | Cichy et al. | |
| 9,750,229 B2 * | 9/2017 | Stewart | A01K 5/0283 |
| 9,775,434 B2 | 10/2017 | Flogaus | |
| 10,144,575 B2 * | 12/2018 | Tan | B65D 75/566 |
| 2001/0040107 A1 * | 11/2001 | Tourre | B65D 83/0894 206/581 |
| 2004/0232029 A1 * | 11/2004 | Cotert | B65D 75/5838 206/494 |
| 2004/0251163 A1 * | 12/2004 | Conde | B65D 83/0805 206/494 |
| 2005/0217591 A1 | 10/2005 | Turner et al. | |
| 2008/0240626 A1 | 10/2008 | Bell | |
| 2010/0054634 A1 | 3/2010 | Runyon et al. | |
| 2010/0310198 A1 * | 12/2010 | Port | B65D 75/5827 383/203 |
| 2011/0114219 A1 * | 5/2011 | Lathim | A01K 5/0114 141/311 R |
| 2012/0074121 A1 | 3/2012 | Gagas et al. | |
| 2015/0068463 A1 | 3/2015 | Worry | |
| 2015/0342143 A1 | 12/2015 | Stewart | |
| 2017/0210513 A1 * | 7/2017 | Chaturvedi | B65D 33/34 |
| 2019/0016580 A1 | 1/2019 | Kruger et al. | |
| 2019/0029222 A1 | 1/2019 | Anderton et al. | |
| 2020/0017269 A1 * | 1/2020 | Duckwall, Jr. | B65D 83/0055 |
| 2020/0071049 A1 * | 3/2020 | Abe | B65D 75/566 |

OTHER PUBLICATIONS https://www.honeyguaridan.com/p/hg-s25-automatic-smart-pet-feeder/—HG S25 Automatic Smart Pet Feeder.
http://www.littergenie.com/cat-litter-system—Litter Genie.
https://us.bona.com/products/stl-cleaner-refill-cartridge.html—Bona Floor Cleaner.
https://www.keurig.com/?utm source=google&utm medium=cpcecomm &campaign=685600263&content=314982246608&keyword=keurig &adgroup=35573224056&gclid-EAlalQobChMIZby 3ouH4glVFEsNCh1KHATEEAAYASAAEgLyZfDBwE—Keurig Coffee Maker.
https://swiffer.com/en-us—Swiffer Cleaning System.
https://www.petnet.io/—Petnet Smart Feeder.
https://www.amazon.com/PetSafe-Automatic-Smartphone-24-Cups-Enabled/dp/B073WYP317?SubscriptionId= AKIAIOZEXUI2QXEWYURQ&tag=ideaing07-20&linkCode=xm2 &camp=2025&creative=165953&creativeASIN-B073WYP317—Petsafe Smart Feeder.
https://ideaing.com/product/arf-pets-automatic-pet-feeder—Arf Pet Automatic Feeder.
https://www.amazon.com/SmartFeeder-Automatic-controlled-Andrioddevices/dp/B01GFTZPDQ%3Fpsc%3D1%26SubscriptionId% 3DAKIAIQYICLTUI4NBTPGA%26tag%3Dideaing07-20% 26linkCode%3Dxm2%26camp%3D2025%26creative%3D165953% 26creativeASIN%3DB01GFTZPDQ—Jempet Petwant Smartfeeder Automatic Pet Feeder, Pet Food Dispenser.

* cited by examiner

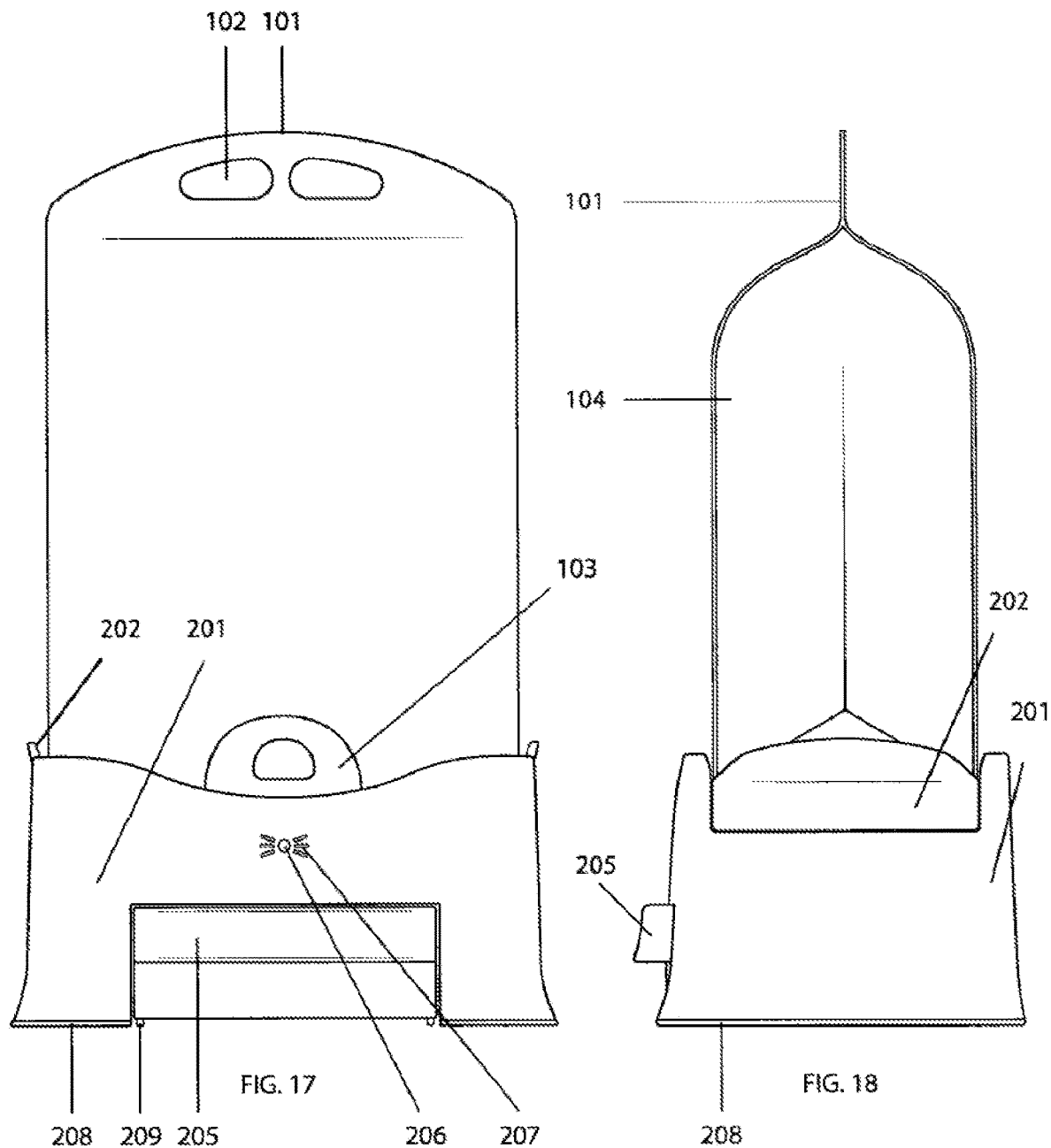

AUTOMATED PET FOOD DISPENSER

CROSS REFERENCE TO RELATED APPLICATIONS

This application claims the benefit of the filing date of U.S. provisional patent application No. 62/935,320 entitled "Automated Pet Food Dispenser", which was filed on Nov. 14, 2019, by the same inventors of this application. That provisional application is incorporated by reference as if fully set forth herein.

FIELD OF THE TECHNOLOGY

One or more disclosed embodiments relate(s) generally to systems and methods for automated dispensing of granular materials, and more specifically but not exclusively to systems and methods for automated dispensing of pet food.

BACKGROUND OF THE TECHNOLOGY

Pet food is often sold through brick and mortar stores. However, such stores typically only stock limited quantities of a large variety of different brands. Thus, each brand is granted only a small amount of shelf space for different sized bags, with larger bags typically being stacked horizontally on lower shelves. Consumers travel to these stores specifically to purchase the brand and flavor their pet eats; however, lack of bag size options or inventory can result in a lost sale for the store or for a converted sale from one brand to another (potentially forever). Additionally, large, heavy bags of food must be lifted by hand into carts, onto checkout counters, and into vehicles for transport to the home. This results in potential overexertion or injury.

More and more people are shopping online and having pet food delivered to their homes. E-commerce stores typically ship pallets of pet food to various distribution centers, where employees must haul and figure out how to pack large bags of product in with the rest of the order. This eliminates the opportunity for automation. With online purchasing of pet food, consumers select the brand, size, and flavor they want and add it to their order. If the order also includes other items, it creates odd cart combinations which pose complications for packing orders (e.g. 15 lbs dog food, glass stemware, shampoo) because of excess space in the standard boxes. Pet food bags often arrive damaged, covered in insects, rancid, or having damaged other items in the box. Shipping mishaps cause consumer frustration, negative reviews, and potential loss of revenue.

Once the pet food reaches the home, it is typically either decanted into a storage container or stored in its original packaging. Existing food bags can be difficult to open and are rarely resealable. Decanting large quantities of pet food into airtight containers keeps the food fresh longer but risks overexertion/spills and immediately removes all brand relationship from the home. Additionally, often only partial bags of food fit into the container, so the bag with the remaining food is typically folded and stored in an unsealed state. Large, unsealed, partially filled bags are unsightly and create brand degradation. The partially filled, rolled/crushed food bag is deemed a nuisance as it slowly empties and the food in the bag degrades more quickly. As a result, further negative impact of the brand occurs. Some consumers stockpile large quantities of food to minimize the unpleasant purchasing experience, which results in more rancid food, storage issues, and potential loss of revenue for companies after a negative consumer experience.

Studies have shown that an unsealed bag of dog food is good for a maximum of two weeks. Additionally, scooping and handling of the food results in excessive crumbs and food dust. Much of the last meal in any bag is crushed crumbs/food dust. Many food bags and storage containers are opaque; thus, consumers do not realize when they are almost out of pet food until they are scooping the bottom of the bag. Emergency trips to the store can be problematic with busy schedules and the possibility that their brand and/or food selection is unavailable, which can disrupt a pet's digestive system. Further, food bags are multi-layered and unable to be reused or recycled, resulting in environmental concerns.

In addition to the problems with the food packaging, many consumers have very little understanding of the amount of food they are giving their pets, which can result in portion control issues and over or underfeeding. Further, miscommunications or a busy day may result in pet owners not being certain who fed the pet, when the pet was fed or if the pet was fed. Manual feeding can cause anxiety for pet owners.

It may be advantageous to create a food bag/container that is configured for efficient transport. It may be advantageous to create a food bag/container that may be integrated with an automated food dispenser. It may be advantageous to create a food dispenser which receives an original food bag/container and automatically dispenses the food from the food bag/container in metered portions.

BRIEF SUMMARY OF THE TECHNOLOGY

Many advantages will be determined and are attained by one or more embodiments of the disclosed technology, which in a broad sense provides systems and methods for automated dispensing of granular material from a prefilled bag/container. In one or more embodiments a storage bag for granular material is provided which is configured for efficient transport. In one or more embodiments a granular material storage bag is provided which is configured for selective integration with an automated dispenser for the contents of the bag.

In one or more embodiments of the technology, a material dispensing system is disclosed. The system may include a base having a base top, a base front and a base rear. The base top may have a base aperture therein. At least a portion of the base top may have a downward slope towards the base aperture. The base top may be strong enough to support a bag of animal food and the bag of animal food may have a bag bottom which has a bag aperture therein and a pull tab removably connected to the bag bottom such that while connected to the bag bottom the pull tab seals the bag aperture. The bag may be selectively supported by the base such that when the bag is being supported by the base, the bag aperture aligns with the base aperture. The base may further include a drawer that is movably connected to the base below the base top, such that the drawer is movable between a first position and a second position towards and away from the base rear respectively. In the first position, the drawer may be located below the base aperture and in the second position at least a portion of the drawer may be extended out from the base front. The base may further include at least two interchangeable bowl-shaped inserts for selectively mating with the drawer, each having a different sized bowl. A selected bowl-shaped insert may define an amount of material that will collect through the base aperture when the drawer is in the first position, the pull tab is removed from the bag bottom and the bag is being supported by the base.

In one or more embodiments of the technology, a material dispensing system is provided. The system may include a container having an inside and a front panel. The front panel may have a top portion and a bottom portion and a handle proximal the top portion of the front panel. The bottom panel is connected to the bottom portion of the front panel and may have an aperture therein. A pull tab may be selectively connected to the bottom panel such that while connected to the bottom panel the pull tab covers the aperture in the bottom panel.

In one or more embodiments of the technology, a material dispensing system is disclosed which may have a base which has a base top, a base front and a base rear. The base top may be shaped to receive a container and have a base aperture. The base may also include a drawer movably connected to the base such that the drawer is movable between a first position and a second position through the base front. When the drawer is in the first position, the drawer may be located below the base aperture and in the second position at least a portion of the drawer may be extended out from the base front. The base may also include a motor connected to the base, a shaft connected to the motor and a gear connected to the shaft. As the motor rotates, it rotates the shaft which in turn rotates the gear which in turn moves the drawer between the first and second positions. The base may include at least two interchangeable bowl-shaped inserts for selectively mating with the drawer. Each of the interchangeable bowl-shaped inserts may have a different sized bowl. The selected bowl-shaped insert may define an amount of material that will collect through the base aperture when the drawer is in the first position.

The technology will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the technology, reference is made to the following description, taken in conjunction with the accompanying drawings, in which like reference characters refer to like parts throughout, and in which:

FIG. 17 illustrates a front view of the container of FIG. 1 or 4 inserted into the dispenser of FIG. 5 or 8 in accordance with one or more embodiments of the disclosed technology;

FIG. 18 illustrates a right-side view of the container of FIG. 1 or 4 inserted into the dispenser of FIG. 5 or 8 in accordance with one or more embodiments of the disclosed technology;

Figure 1:
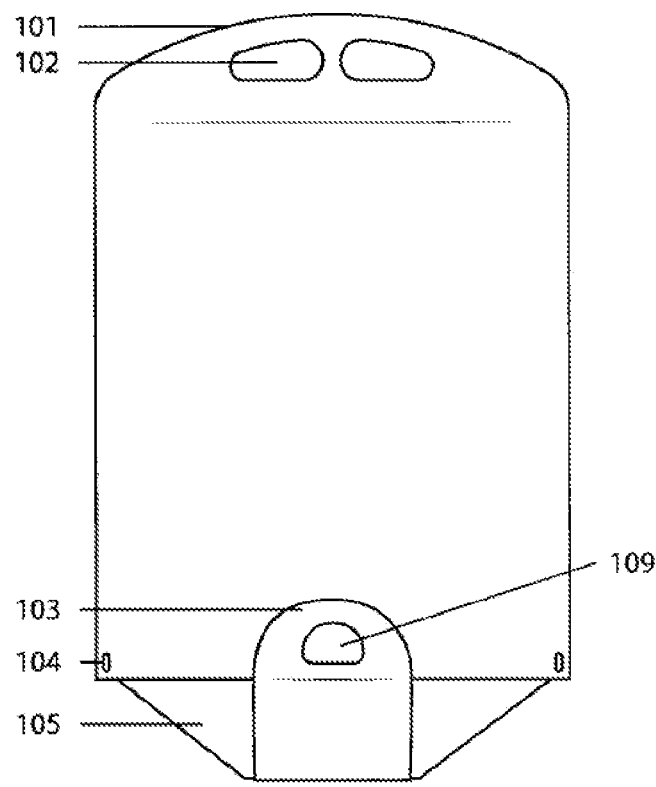
FIG. 1 illustrates a front view of a container in accordance with one or more embodiments of the disclosed technology.
Figure 2:
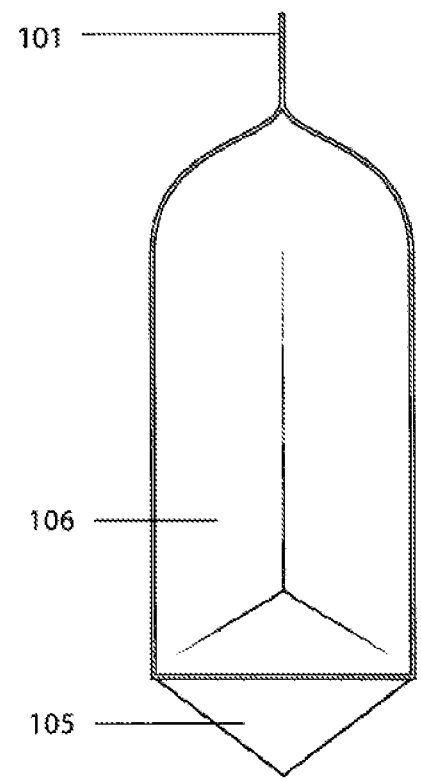
FIG. 2 illustrates a side view of the container of FIG. 1.
Figure 3:
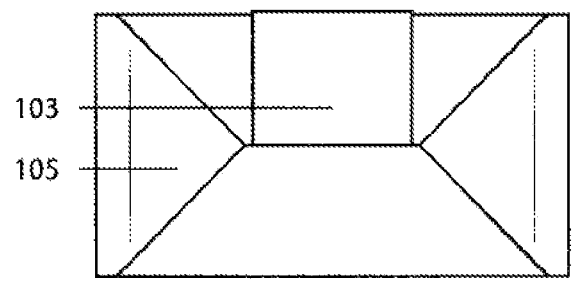
FIG. 3 illustrates a bottom view of the container of FIG. 1.
Figures 4A, 4B, 4C:
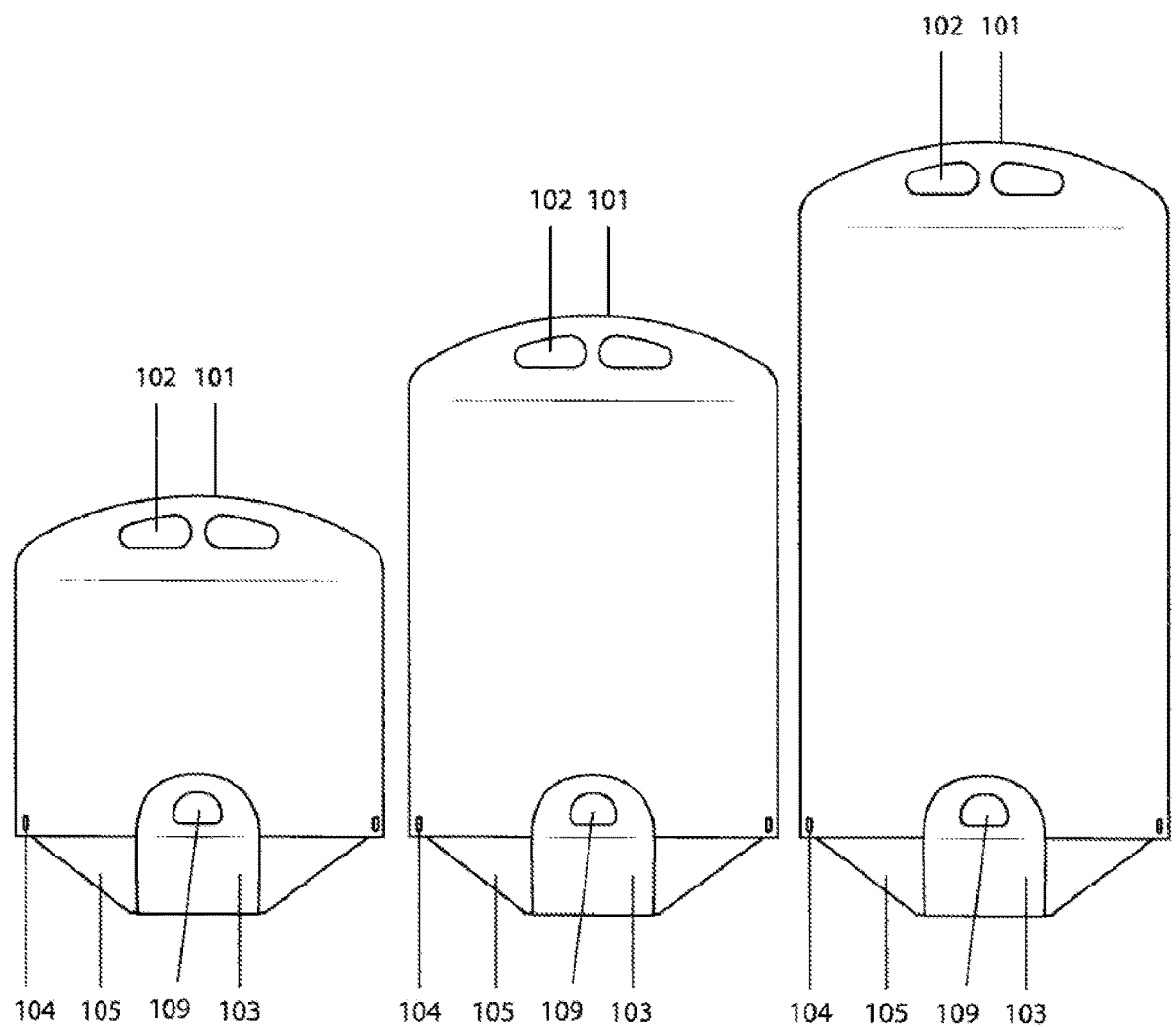
FIG. 4A-C (collectively "FIG. 4" or "FIG. 4") illustrates a front view of different sized containers in accordance with one or more embodiments of the disclosed technology.
Figure 5:
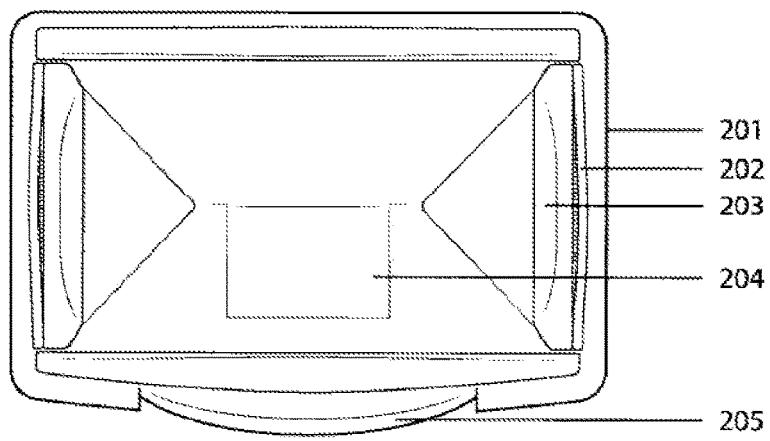
FIG. 5 illustrates a top view of a dispenser in accordance with one or more embodiments of the disclosed technology, which may be utilized in combination with a container illustrated in FIGS. 1 and 4.
Figure 6:
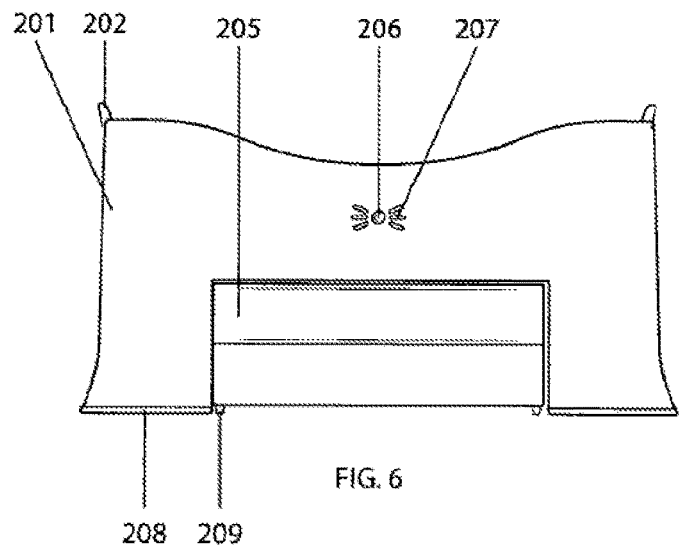
FIG. 6 illustrates a front view of the dispenser of FIG. 5.
Figure 7:
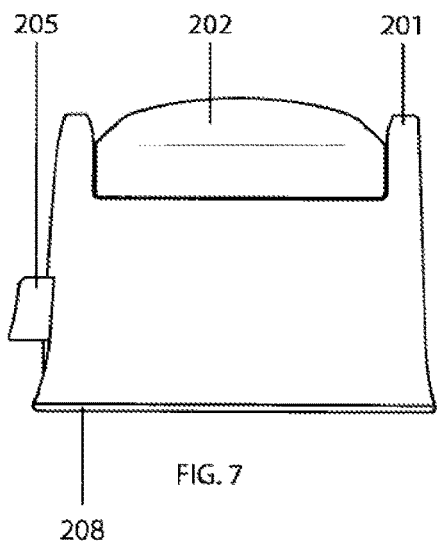
FIG. 7 illustrates a right-side view of the dispenser of FIG. 5.
Figure 8:
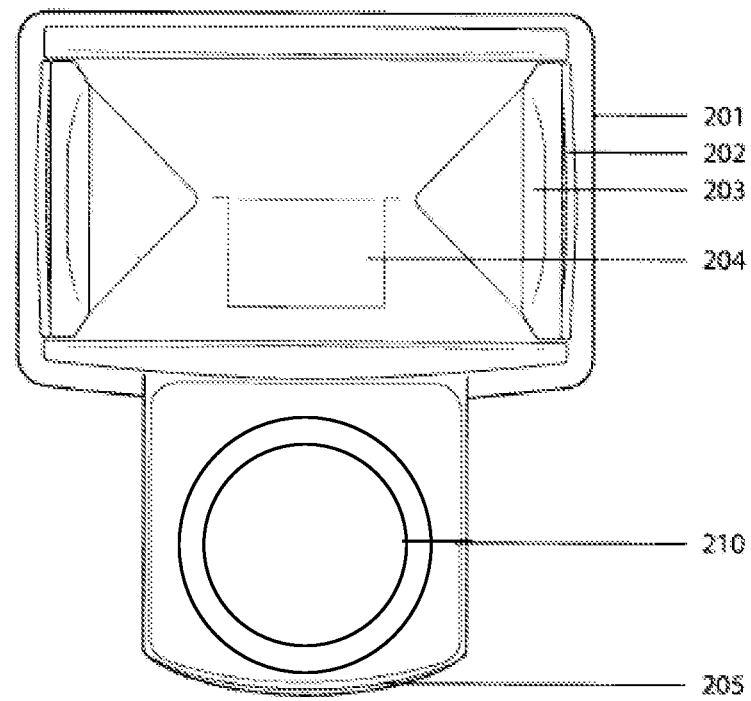
FIG. 8 illustrates a top view of a dispenser in accordance with one or more embodiments of the disclosed technology, with a drawer in an extended position.
Figure 9:
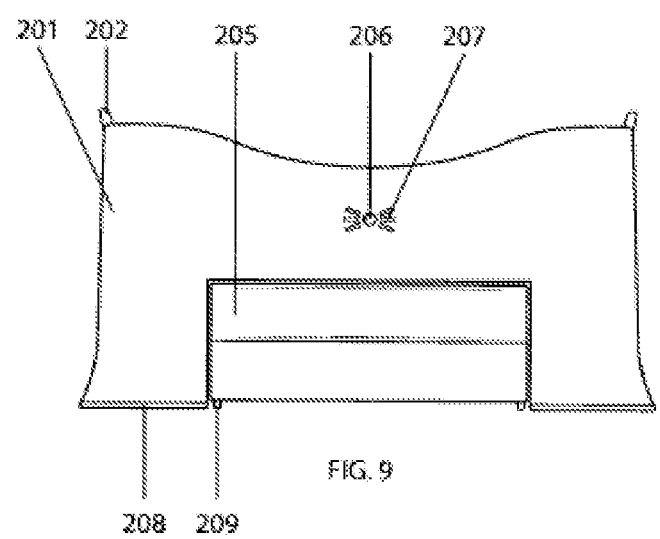
FIG. 9 illustrates a front view of the dispenser of FIG. 8
Figure 10A:
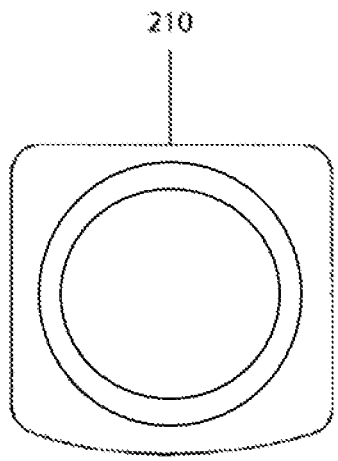
FIG. 10A-C (collectively "FIG. 10" or "FIG. 10") illustrates a top view of various inserts that may fit within the drawer of FIG. 8.
Figure 10B:
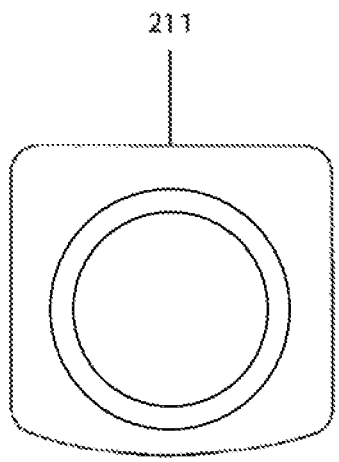
Figure 10C:
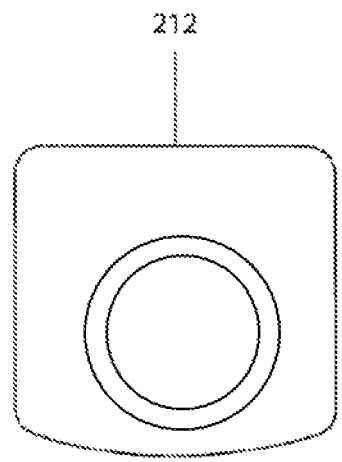
Figure 11A:
FIG. 11A-C (collectively "FIG. 11" or "FIG. 11") illustrates a front view of the inserts of FIG. 10.
Figure 12A:
FIG. 12A-C (collectively "FIG. 12" or "FIG. 12") illustrates a right-side view of the inserts of FIG. 10.
Figure 11B:
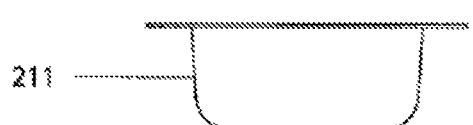
Figure 12B:
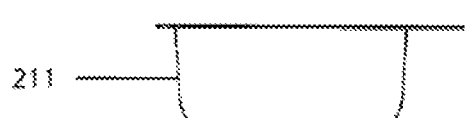
Figure 11C:
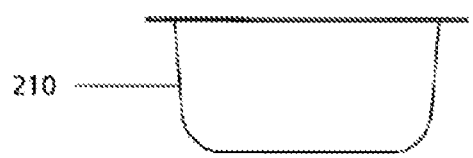
Figure 12C:
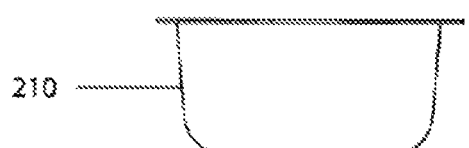

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE INVENTION

Referring to the figures in detail wherein like reference numerals identify like elements throughout the various figures, there is illustrated in FIGS. 1-23 systems and methods for ecommerce of containers of granular items, such as pet food, and automated dispensing of the granular items, such as with an automated pet feeder. The following description will be limited to dog food bags and an automated dispenser therefor. However, embodiments of the technology are not so limited and one skilled in the art will be able to understand how to employ the system generally from the specific embodiments disclosed. The system and method may be employed with cat food, grains, fertilizer, weed killer, sand, gravel, etc. Further, while the following description will be limited to purchasing dog food via the Internet and automated feeding of a dog, those skilled in the art will recognize that one or more embodiments of the invention can be utilized in other environments as well and that this is not a limiting factor.

Discussion of an embodiment, one or more embodiments, an aspect, one or more aspects, a feature, one or more features, or a configuration or one or more configurations is intended to be inclusive of both the singular and the plural depending upon which provides the broadest scope without running afoul of the existing art and any such statement is in no way intended to be limiting in nature. Technology described in relation to one or more of these terms is not necessarily limited to use in that embodiment, aspect, feature or configuration and may be employed with other embodiments, aspects, features and/or configurations where appropriate. As used herein, the singular forms "a", "an" and "the" are intended to include the plural forms as well, unless the context clearly indicates otherwise. The terms "connected" and "coupled" may be used interchangeably and may include two or more elements that are directly attached to each other with no intermediary item and/or may include two or more element that are attached to each other via one or more elements. The terms mate or any variation thereof means that two or more elements once mated may be selectively connected/disconnected or permanently connected.

For purposes of this disclosure, the following terms are to be afforded the following meanings:

Container means a bag, box or sac, which can be made from a relatively light weight material such as film, paperboard, cardboard, paper, plastic, or some combination of the same.

Granular Material means any material such as, but not limited to dog food, cat food, other pet food, sand, gravel, fertilizer, weed killer and the like that can be transported in and dispensed from a container.

E-commerce or ecommerce means any form of purchasing system and/or method which includes delivery of the purchased item to an address selected by the purchaser. Dispenser means a device for dispensing the granular material from the container. Drawer means any enclosure that can be selectively moved between an enclosed or partially enclosed position within the dispenser and an exposed or partially exposed position external to the dispenser.

Insert means an element that has at least a bowl portion which is separate from but is selectively mate-able with the drawer, forms an integral part of the drawer, or is separate from but connects to the drawer to hold the granular material dispensed from the container. The bowl shape may be concave, cubical, rectangular, prism shaped or virtually any other shape that is suitable for holding the granular material for a temporary time.

Figures 13, 14:
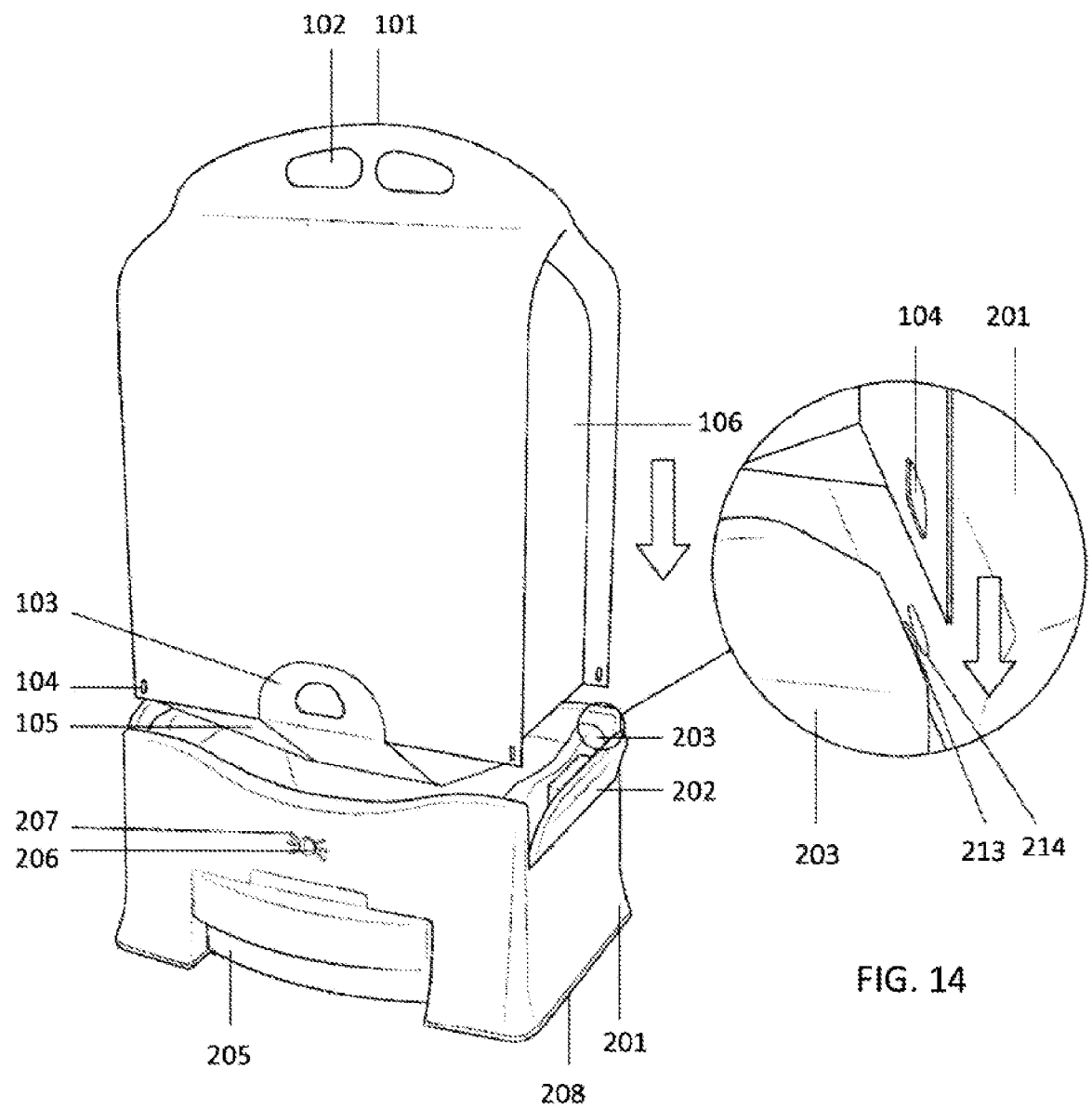
FIG. 13 illustrates an orthogonal view of the container of FIG. 1 or 4 being inserted into the dispenser of FIG. 5 or 8 in accordance with one or more embodiments of the disclosed technology.
FIG. 14 illustrates a crop-view of a portion of FIG. 13 illustrating a connection point between the container and the dispenser in accordance with one or more embodiments of the disclosed technology.
Figures 15, 16:
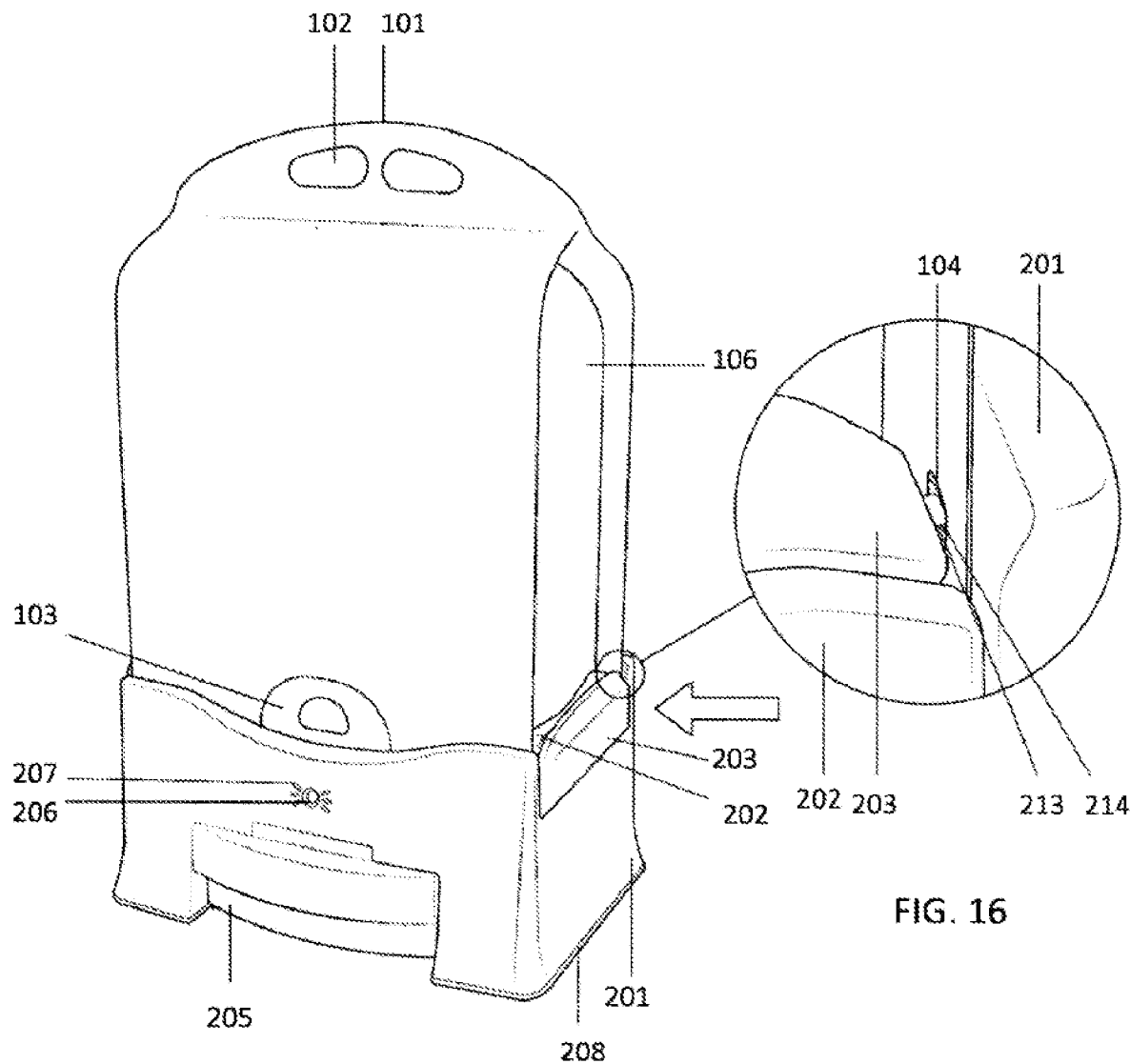
FIG. 15 illustrates an orthogonal view of the container of FIG. 1 or 4 inserted into the dispenser of FIG. 5 or 8 in accordance with one or more embodiments of the disclosed technology.
FIG. 16 illustrates a crop-view of a portion of FIG. 15 illustrating a connection between the container and the dispenser in accordance with one or more embodiments of the disclosed technology.
Figure 19:
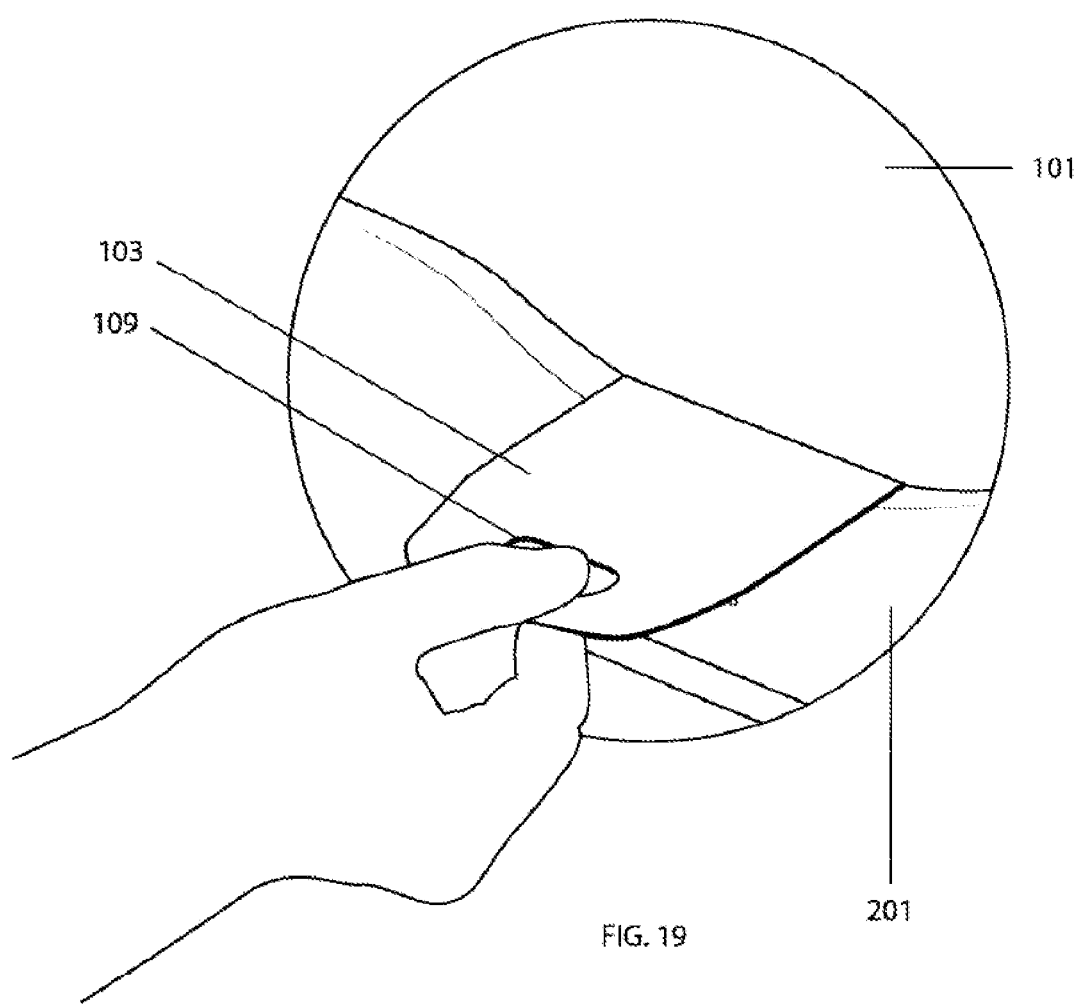
FIG. 19 illustrates a crop-view of a portion of the container of FIG. 1 or 4 illustrating a pull tab for opening the container in accordance with one or more embodiments of the disclosed technology.
Figure 20:
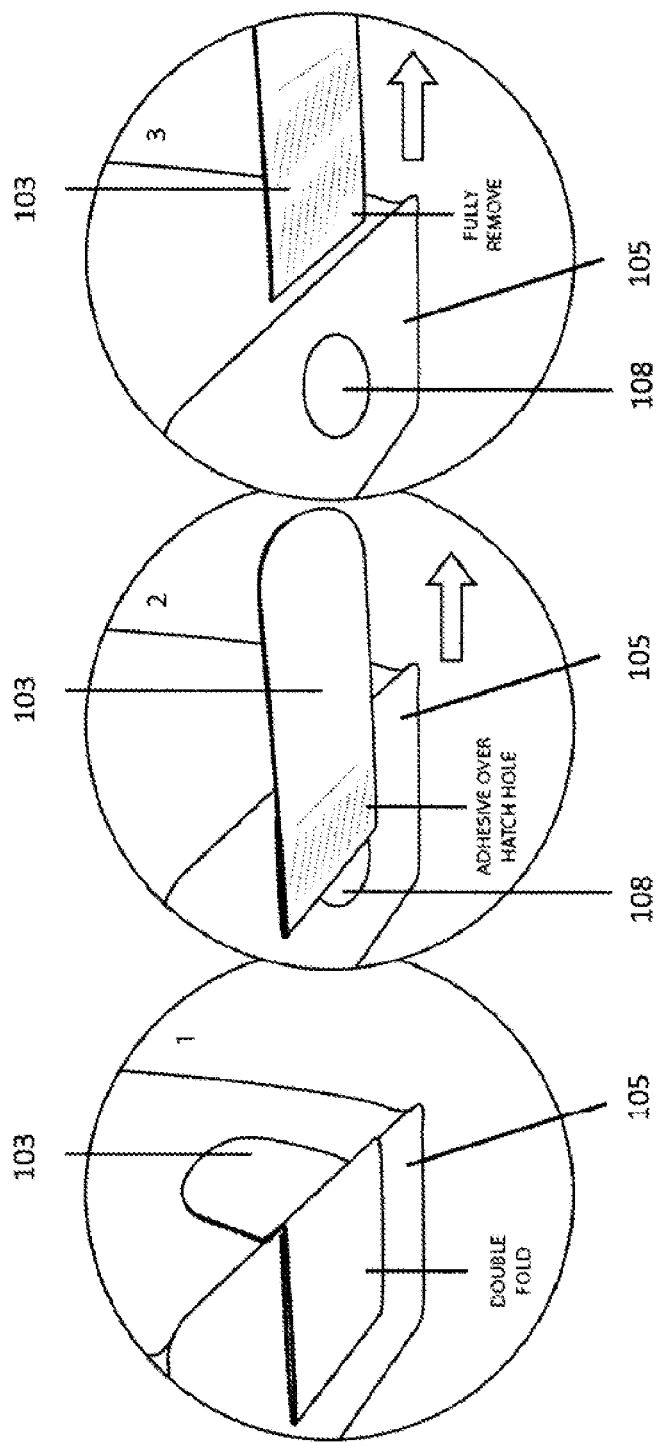
FIG. 20 illustrates a sequence of crop-views of a portion of the container of FIG. 1 or 4 illustrating a pull tab being pulled to open the container in accordance with one or more embodiments of the disclosed technology.
Figure 21:
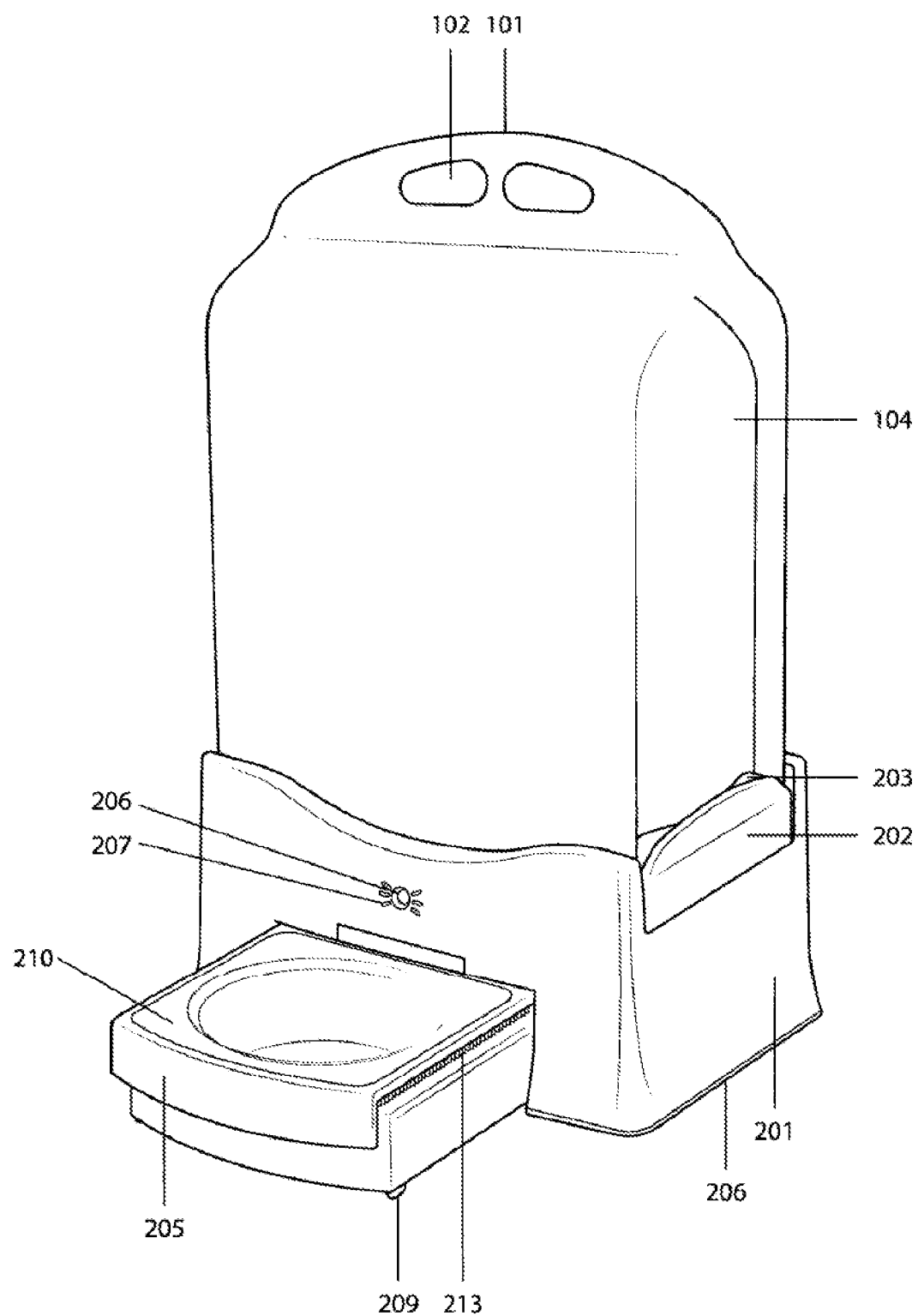
FIG. 21 illustrates an orthogonal view of the container of FIG. 1 or 4 inserted into the dispenser of FIG. 5 or 8 with a drawer in an extended position and an insert of FIGS. 10 through 12 located within the drawer in accordance with one or more embodiments of the disclosed technology.
Figure 22A:
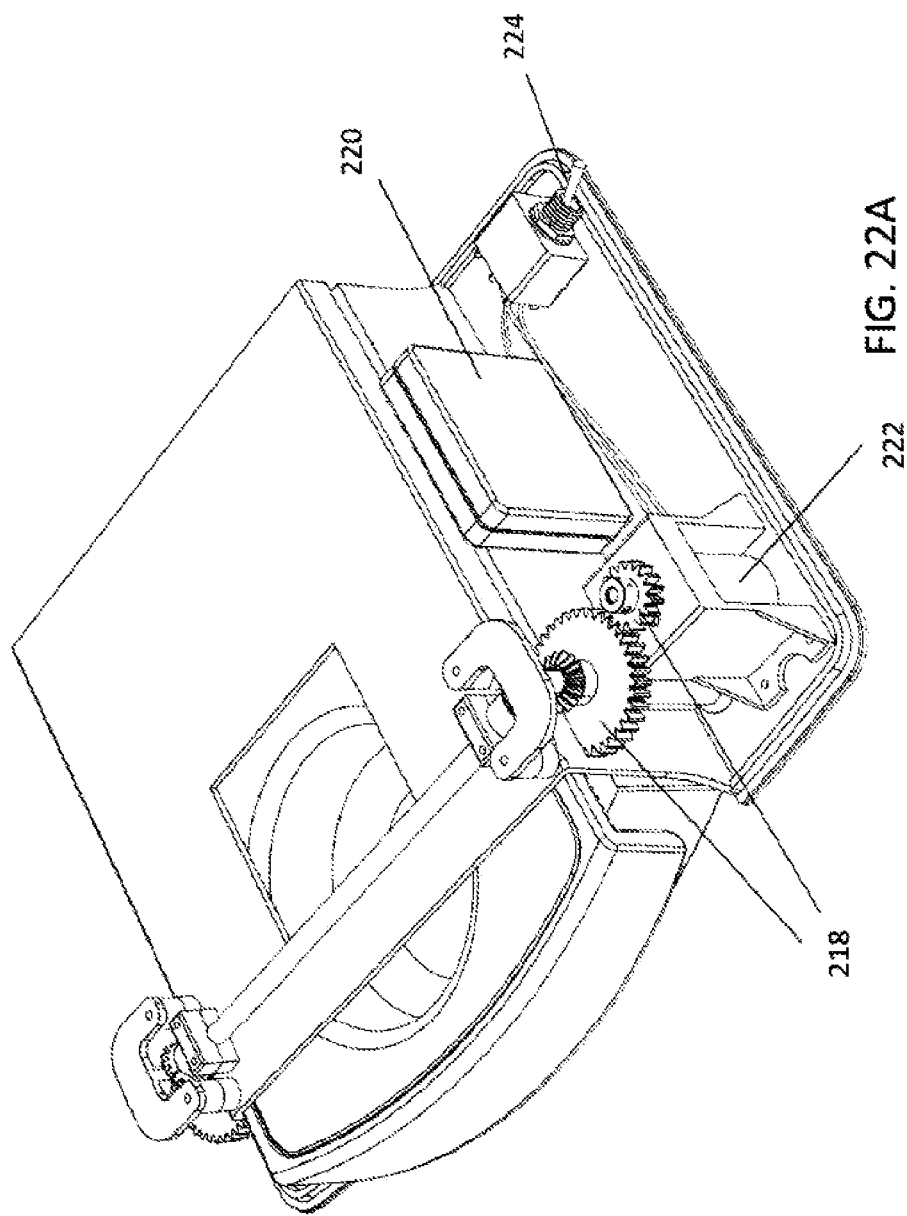
FIGS. 22A and 22B illustrate an orthogonal view of an interior of the dispenser of FIG. 5 or 8 illustrating a possible configurations for automating the movement of the drawer in accordance with one or more embodiments of the disclosed technology; and, FIGS. 23A and 23B illustrate a sectioned view of an interior of the dispenser with a door for selectively opening and closing an intake portion of the dispenser in accordance with one or more embodiments of the disclosed technology.
Figure 22B:
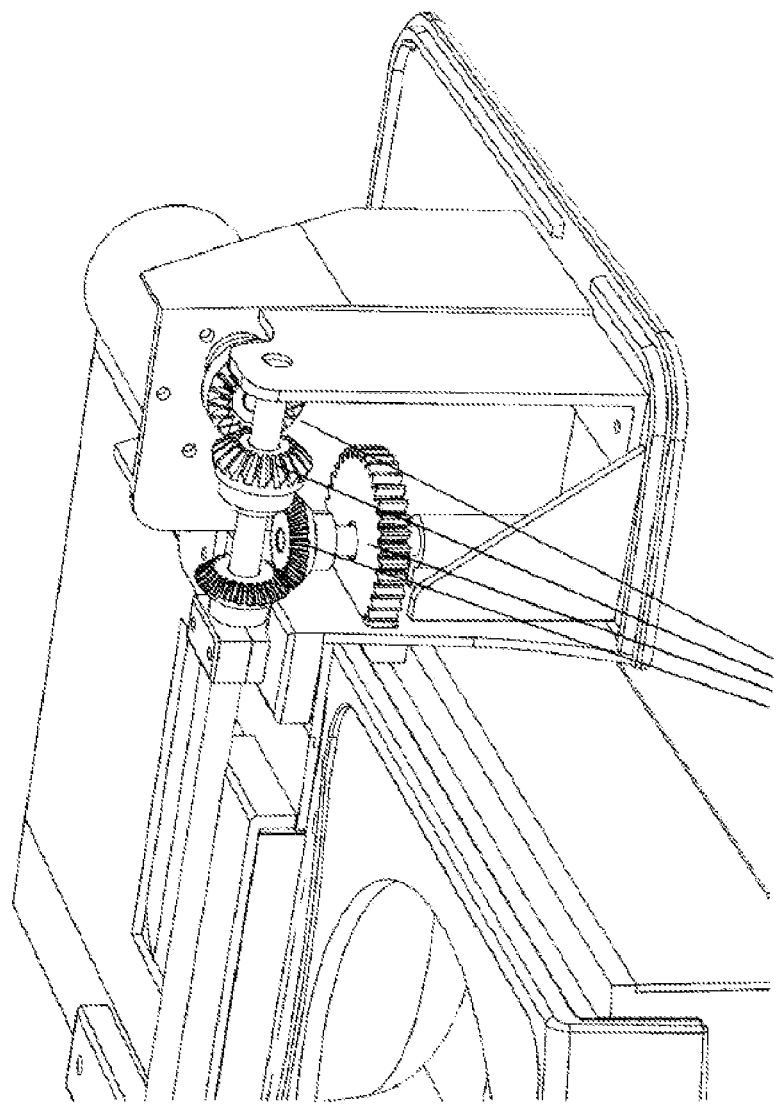
Figure 23A:
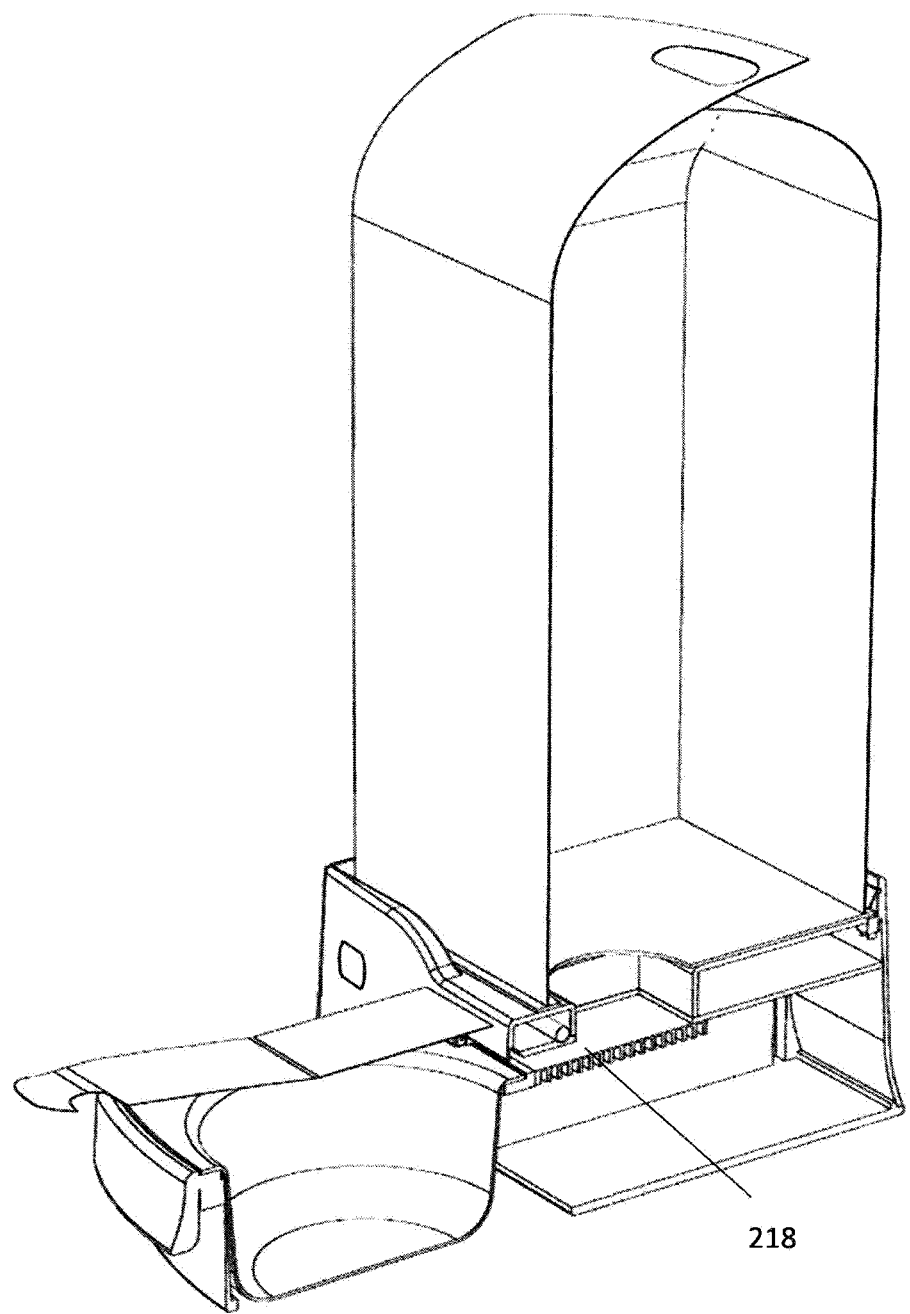
Figure 23B:
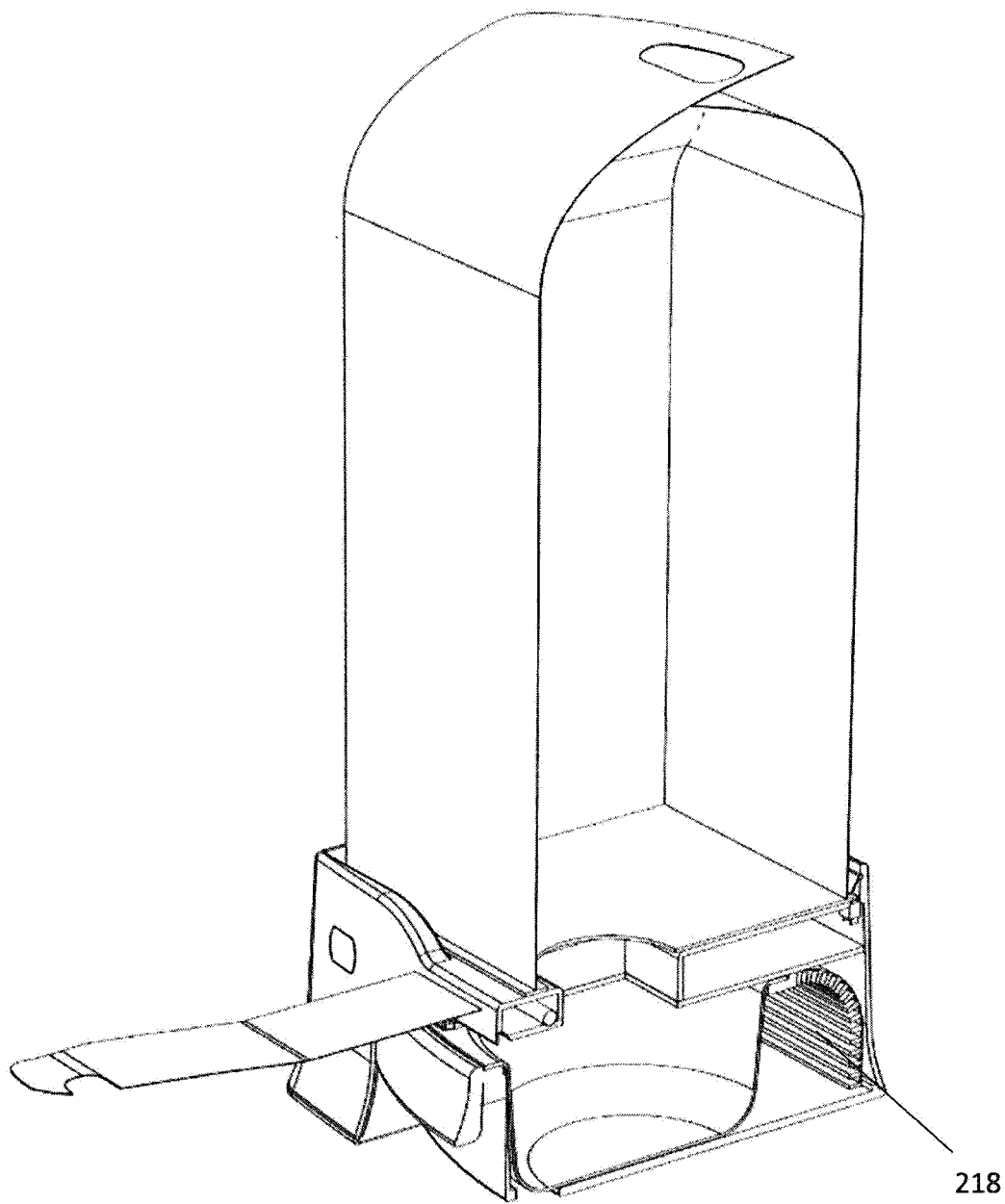

As illustrated in FIGS. 1-4, the technology includes a container such as a dog food bag which is designed for easy lifting and dispensing of the dog food. The top 101 includes a handle 102 which may be incorporated into the bag. The container may be made from a single material or it may be made from a firmer outer material 107 (FIG. 13) such as but not limited to paper board and a more pliable inner material 106 (FIG. 13) such as but not limited to a plastic film. The outer material 107 could surround the inner material 106, or it could surround/support a portion of the inner material 106, such as by covering the front and rear faces of the container (as illustrated in FIG. 13). The outer material 107 may extend past an edge of the inner material as illustrated in FIG. 13. The handle 102 may be formed as one or multiple holes formed in the firmer outer material. Additionally, it is considered within a scope of the technology that the handle may be a conventional handle formed of a separate material or materials connected to the container. The bottom of the container 105 may be flat (as illustrated in FIG. 20) for resting on a relatively flat surface or it could be contoured as illustrated in FIGS. 1-4. While not a requirement, the size of the container could be configured to hold 2 weeks of food based on the size of the intended pet to prevent spoilage. In one or more embodiments, there is an opening 108 provided in the bottom 105 of the container and the opening 108 is covered by a pull tab 103 that may be removable from the container for accessing the opening 108. There may be more than one opening 108 and more than one pull tab 103 and the opening 108 may be in the center of the bottom 105 or off center and still fall within a scope of one or more claims. The shape of an opening 108 may be circular or some other shape or there could be different openings 108 with different shapes. The pull tab 103 may extend beyond the edge of the container such that when the container is placed on a surface at least a portion of the pull tab 103 is still accessible. The pull tab 103 may extend beyond a front, side or back of the container. As illustrated in FIG. 1, the pull tab 103 may include an opening 109 therein for assisting with the pulling of the pull tab 103, although an opening is not required. The pull tab 103 may be fully connected to the container during shipping to prevent the pull tab 103 from being prematurely pulled. It may be glued, taped, or it may be inserted into a slot (not illustrated).

The container may be configured for use with a dispenser 201 such as the one illustrated in FIGS. 5-9, 13, 15, 17, 18 and 21-23. The dispenser 201 may be an automated dispenser 201 that includes an opening 204 that corresponds in shape and location exactly or mostly to the opening 108 in the bottom of the container when the container is placed into the dispenser 201 as illustrated in FIGS. 13-18, 21 and 23. The dispenser 201 may include various gears 218, motors 222, intelligence and batteries and/or it may include a plug for connecting to an electrical outlet, and a door 216 (e.g. a tambour door as illustrated in FIGS. 23A and 23B) which may be connected to a drawer 205 that sits below the container when the drawer 205 is in a closed/enclosed position. The gear ratios and motor size may define the speed and force that the drawer 205 opens and closes and the intelligence (such as a programmed processor, an application specific integrated circuit (ASIC), etc.) may, among other things, also be employed to determine the speed and/or force in which the drawer 205 is opened and/or closed. The intelligence may also be programmed to operate/interact with the camera, microphone, timer, WiFi connection, cellular connection and/or any other design features that are included in the dispenser 201. When the drawer 205 opens/is exposed the door 216 covers the openings 108/204 in the container and dispenser and when the drawer 205 closes the door 216 is removed from the openings 108/204 thus allowing the material from the container to fall into the drawer 205 or an insert 210/211/212. The door 216 and/or the drawer 205 may sit in/ride within a track to maintain its location proximal the opening 204 in the dispenser 201. In one or more embodiments, as illustrated in FIGS. 10-12 and 21, the dispenser 201 may include one or more bowl inserts 210/211/212 that sit in and/or on the drawer 205. Different sized inserts 210/211/212 may be employed for different sized animals. The inserts may lock in place or they may simply sit in/on the drawer 205.

In one or more embodiments, the drawer 205 may be manually pushed in and pulled out from the base of the dispenser. Each time the drawer 205 is pushed in if it is not already full, it fills with food from the container. In one or more embodiments, the drawer 205 may be automated such that the movement of the drawer 205 in and out of the base is driven by one or more motors 222 and one or more gears 218. The motor 222 may be activated by a switch 224 that is located in/on the dispenser 201 and/or it may be activated by a switch located remote from the dispenser 201 which communicates with the dispenser 201 via a network or via short-range or medium range wireless interconnection such as but not limited to Bluetooth or infrared. In one or more embodiments the dispenser 201 may include a network connection which may be a wired and/or wireless connection. The remote switch may be a standalone device and/or it may be a software-based switch that is part of a software application ("app") such as those for use with a smartphone. The dispenser 201 may include a camera 206 for remote viewing of the pet and/or the dispenser 201 may include a microphone and/or speaker 207 for remote communication with the pet. An app located on a smart phone may provide configuring ability for the dispenser 201. A consumer may be provided the ability to schedule when the drawer 205 opens and/or closes, when to order new food, to open and close the drawer 25 at other than scheduled times, to access a camera 206 and/or speaker and/or a microphone 207 associated with the dispenser 201, etc.

When the container is placed into the dispenser 201, it may include one or more holes 104 (FIG. 13) for mating with one or more corresponding hooks/latches/protrusions ("hooks") 213 on the dispenser 201 (e.g. a "locking mechanism"). The mating may be automatic such that the holes 104 line up with the hooks 213 (FIGS. 14 and 16) and no further human intervention is necessary to mate the hooks 213 and holes 104 other than placing the container into the dispenser 201. For removal, the dispenser 201 may include a mechanism (e.g. a living hinge, a spring load, etc.) for retracting the hooks 213 to remove them from the holes 104 in the container or the consumer may merely rip the container off of the hooks 213. One or more holes 104 may require further human intervention for the mating or disconnecting thereof. One or more holes 104 and hooks 213 may be interchanged (e.g. hole(s)/indentation(s) in the dispenser and hook(s) on the container) and still fall within a scope of the claims. In other words, the bag may include one or more hooks and the dispenser may include one or more holes/indentations.

In an exemplary operation, a consumer places an order online or over the phone for the system and receives the dispenser and one or more containers of pet food. Bowls and containers of food may be tailored to the pet size and needs. Food container sizes may be based on 2-3 weeks of food, avoiding rancid meals and may be packaged in Amazon Tier 1 Frustration Free packaging such that Amazon over-box may not be needed (ships in its own box) although other sizes and transportation methods may be employed. All materials may be curbside recyclable materials. The consumer docks the pet food container into the dispenser 201 and removes the tab. The dispenser 201 which is fed from the bottom of the container prevents air contamination within the bag and ensures the freshness of the pet food. It also keeps branding on the outside of the bag attractive and worthy of everyday display in the home. There is no need for transfer to after-market storage containers or dispensers. The consumer may register a Wi-Fi enabled base in a related mobile app. Such registration is well known. The ability to select a bowl size, as well as to set mealtimes and durations, allows pet owners to have maximum control over the health of their pet. At each scheduled mealtime, the motorized drawer 205 with insert 210/211/212 may slide forward and optionally may provide an audio cue to the pet that food is available. Whether the consumer is at home or away, they can be secure in the fact that their pet is provided food. The drawer 205 may be set to retract after a set duration to encourage timely consumption by the pet and to avoid consumption by other animals or children or the attraction of bugs or rodents. An optional camera feature in the dispenser may be accessible by a remote phone via an app for the consumer to check in and maintain a relationship with their pet and to maintain brand recognition. Based on the insert size selected, container size, and feeding schedule, the system may calculate when the food in the container is running low and may automatically reorder additional food. Alternatively, the system may include a weight sensor for the determining the amount of food remaining in the bag. The system may provide an alert (e.g. a visual, audio and/or an alert for a related mobile app) rather than automatically reordering. This system encourages a long-term, trusting relationship with a pet food brand and results in a satisfied customer and increased, regular revenue for a brand.

Having thus described preferred embodiments of the technology, advantages can be appreciated. Variations from the described embodiments exist without departing from the scope of the technology. Systems and methods are provided for packaging and shipping granular materials and automated dispensing thereof. Although specific embodiments have been disclosed herein in detail, this has been done for purposes of illustration only, and is not intended to be limiting with respect to the scope of the claims, which follow. It is contemplated by the inventors that various substitutions, alterations, and modifications may be made without departing from the spirit and scope of the technology as defined by the claims. For example, the system may be configured to support multiple food containers and/or a liquid dispenser. Other aspects, advantages, and modifications are considered to be within the scope of the following claims. The claims presented are representative of the technology disclosed herein. Other, unclaimed technology is also contemplated. The inventors reserve the right to pursue such technology in later claims.

Insofar as embodiments of the invention described above are implemented, at least in part, using a computer system, it will be appreciated that a computer program for implementing at least part of the described methods and/or the described systems is envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by one or more application specific integrated circuits and/or optical elements. Suitably, the computer program can be stored on a carrier medium in computer usable form, which is also envisaged as an aspect of the invention. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all of the generic and specific features of the technology as described herein, and all statements of the scope of the technology which, as a matter of language, might be said to fall there between.

Having described the technology, what is claimed as new and secured by Letters Patent is:

The invention claimed is:

1. A material dispensing system comprising:
a container having an inside and a front panel, the front panel having a top portion and a bottom portion; the front panel having a handle proximal the top portion of the front panel; the front panel having at least one mating aperture located within the bottom portion of the front panel therein, wherein the at least one mating aperture does not provide access to the inside of the container;
a bottom panel connected to the bottom portion of the front panel; wherein the bottom portion of the front panel extends beyond the bottom panel and the at least one mating aperture is located within the bottom portion of the front panel that extends beyond the bottom panel;
the bottom panel having an aperture therein; and,
a pull tab selectively connected to the bottom panel such that while connected to the bottom panel the pull tab covers the aperture in the bottom panel.

2. The material dispensing system according to claim 1 wherein the bottom portion of the front panel extends beyond the bottom panel and the at least one mating aperture is located within the bottom portion of the front panel that extends beyond the bottom panel.

3. The material dispensing system according to claim 2 the container further including a rear panel, the rear panel having a rear top portion and a rear bottom portion; the rear panel having a handle proximal the rear top portion of the rear panel; the bottom panel connected to the rear bottom portion of the rear panel wherein the rear bottom portion of the rear panel extends beyond the bottom panel and the rear panel having at least one mating aperture therein, wherein the at least one mating aperture in the rear panel does not provide access to the inside of the container.

4. The material dispensing system according to claim 1 wherein the front panel and the bottom panel are formed from a same material.

5. The material dispensing system according to claim 1 wherein the front panel and the bottom panel are formed from different materials, the material forming the front panel being stiffer than the material forming the bottom panel.

6. The material dispensing system according to claim 1 wherein the front panel and the bottom panel are different parts of a same panel.

7. The material dispensing system according to claim 6 wherein the multiple panels are formed as a plurality of folds in a single panel.

8. The material dispensing system according to claim 1 wherein the bottom panel includes multiple panels connected to form an angled base which bows out from the inside of the container and the aperture is at a nadir of the bottom panel.

9. A material dispensing system comprising:
a container having an inside and a front panel, the front panel having a top portion and a bottom portion; the front panel having a handle proximal the top portion of the front panel;
a bottom panel connected to the bottom portion of the front panel;
the bottom panel having an aperture therein; and,
a pull tab selectively connected to the bottom panel such that while connected to the bottom panel the pull tab covers the aperture in the bottom panel;
a base having a base top, a base outside and a base inside; the base top being shaped to receive the container bottom and allow the container to sit on the base and including a base aperture which substantially coincides with the bottom panel aperture of the container when the container is received by the dispenser;
a drawer movably connected to the base, such that the drawer is movable between a fill position which is at least partially within the base inside and a dispense position which is at least partially outside of the base inside; wherein when the drawer is in the fill position, at least a portion of the drawer sits beneath the base aperture.

10. The material dispensing system according to claim 9 further including a door panel connected to the drawer and movable with the movement of the drawer such that when the drawer is in the dispense position the door covers the base aperture and when the drawer is in the fill position the door exposes at least a portion of the base aperture.

11. The material dispensing system according to claim 9 the dispenser further including a power supply, a processor electrically connected to the power supply, a motor electrically connected to the power supply for moving the drawer between the dispense and fill positions;
a network connection, wherein the processor is electrically connected to the network connection, a camera electrically connected to the processor; a speaker electrically connected to the processor and a microphone electrically connected to the processor.

12. The material dispensing system according to claim 9 further comprising a locking mechanism wherein a portion of the locking mechanism is located on the dispenser, another portion of the locking mechanism is located on the container and the portion and the another portion of the locking member are selectively mated when the container is placed into the dispenser; and,
when the portions of the locking member are mated, the locking mechanism maintains the container within the dispenser.

13. The material dispensing system according to claim 12 wherein the bottom portion of the front panel extends beyond the bottom panel and the bottom portion of the front panel which extends beyond the bottom panel has at least one front panel aperture; wherein the portion of the locking mechanism located on the container includes the at least one front panel aperture.

14. The material dispensing system according to claim 13 the container further including a rear panel the rear panel having a handle proximal the top portion of the rear panel; the bottom panel connected to the bottom portion of the rear panel wherein the bottom portion of the rear panel extends beyond the bottom panel and the bottom portion of the rear panel which extends beyond the bottom panel has at least one rear panel aperture; wherein the portion of the locking mechanism located on the container further includes the at least one rear panel aperture.

15. A material dispensing system comprising:
a base having a base top, a base front and a base rear; the base top being shaped to receive a container and having a base aperture;
a drawer movably connected to the base such that the drawer is movable between a first position and a second position through the base front; wherein in the first position, the drawer is located below the base aperture and in the second position at least a portion of the drawer is extended out from the base front;
a motor connected to the base;
a shaft connected to the motor;
a gear connected to the shaft; wherein as the motor rotates, the motor rotates the shaft which in turn rotates the gear which in turn moves the drawer between the first and second positions;
at least two interchangeable bowl-shaped inserts for selectively sitting in the drawer, each having a different sized bowl, wherein a selected bowl-shaped insert defines an amount of material that will collect through the base aperture when the drawer is in the first position.

16. The material dispensing system according to claim 15 further including a door panel connected to the drawer and movable with the movement of the drawer such that when the drawer is in the first position the door panel is located between the drawer and the base rear and when the drawer is in the second position the door panel is covering the base aperture.

17. The material dispensing system according to claim 16 wherein the door panel is a tambour door panel.

18. The material dispensing system according to claim 15 further comprising a container having a container bottom which has a container aperture therein and a pull tab removably connected to the container bottom such that while connected to the container bottom the pull tab seals the container aperture;
the container further having a plurality of sides; wherein at least two of the plurality of sides each has at least one side locking mechanism;
the base having at least two base locking mechanisms configured to respectively mate with each of the side locking mechanisms; and,
the container being selectively supported by the base such that when the container is being supported by the base, the at least two base locking mechanisms mate with the side locking mechanisms and the container aperture aligns with the base aperture.

19. The material dispensing system according to claim 18 wherein the container is a bag and the bag has at least one handle formed in at least one of the plurality of sides.

20. A material dispensing system comprising:
a base having a base top, a base front and a base rear; the base top having a base aperture therein; at least a portion of the base top having a downward slope towards the base aperture; the base top being strong enough to support a bag of animal food; wherein the bag of animal food has a bag bottom which has a bag aperture therein and a pull tab removably connected to the bag bottom such that while connected to the bag bottom the pull tab seals the bag aperture;
the bag being selectively supported by the base such that when the bag is being supported by the base, the bag aperture aligns with the base aperture;
the base further including a drawer movably connected to the base below the base top such that the drawer is movable between a first position and a second position towards and away from the base rear; wherein in the first position, the drawer is located below the base aperture and in the second position at least a portion of the drawer is extended out from the base front;
at least two interchangeable bowl-shaped inserts for selectively mating with the drawer, each having a different sized bowl, wherein a selected bowl-shaped insert defines an amount of material that will collect through the base aperture when the drawer is in the first position, the pull tab is removed from the bag bottom and the bag is being supported by the base.

21. The material dispensing system according to claim 20 further including a locking mechanism for selectively locking the bag to the base, wherein a portion of the locking mechanism is located on the bag and another portion of the locking mechanism is located on the base.

* * * * *